Nov. 26, 1940.  W. KRÄMER  2,222,714

CONTROL CIRCUIT

Filed June 3, 1937

Inventor:
Werner Krämer,
by Harry E. Dunham
His Attorney.

Patented Nov. 26, 1940

2,222,714

UNITED STATES PATENT OFFICE 2,222,714

CONTROL CIRCUIT

Werner Krämer, Berlin-Karlshorst, Germany, assignor to General Electric Company, a corporation of New York Application June 3, 1937, Serial No. 146,279
In Germany June 20, 1936

20 Claims. (Cl. 172—239)

My invention relates to control circuits, and more particularly to control circuits for automatic electrical regulators.

Control circuits for electrical regulators are sometimes unnecessarily sensitive in that they cause the regulating means to function in response to unimportant, minute and momentary fluctuations of the regulated quantity. When the regulating mechanism includes moving parts this undue sensitivity of the control element results in excessive operation and wear of the mechanism. If the regulator is a so-called step regulator, in which regulation of the controlled quantity is made in definite steps, this is doubly disadvantageous because it almost always results in so-called pumping or hunting action of the regulator.

In accordance with my invention, I provide novel means for so modifying the operating characteristics of an automatic control circuit that it will be relatively insensitive over any given predetermined range or zone while it will be very sensitive outside of this zone.

An object of my invention is to provide a new and improved automatic electrical control circuit.

Another object of my invention is to provide an automatic regulator control circuit which, without depending upon the use of contacts, is relatively insensitive over a given range and is relatively very sensitive outside of this range.

A further object of my invention is to provide means for so modifying the volt-ampere characteristic of a non-linear ferro-resonant circuit that it is particularly suitable for controlling motor-operated step voltage regulators.

My invention will be better understood from the following description taken in connection with the accompanying drawing and its scope will be pointed out in the appended claims.

Figure 1:
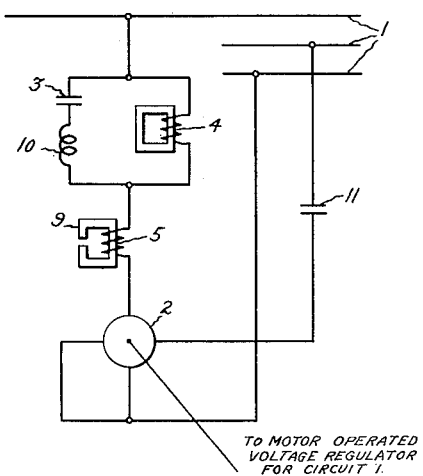
Figure 3:
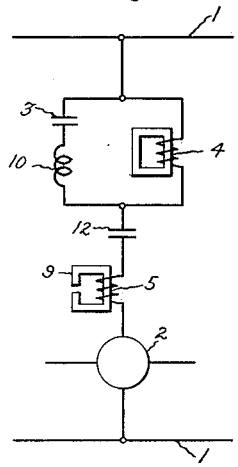
Figure 2:
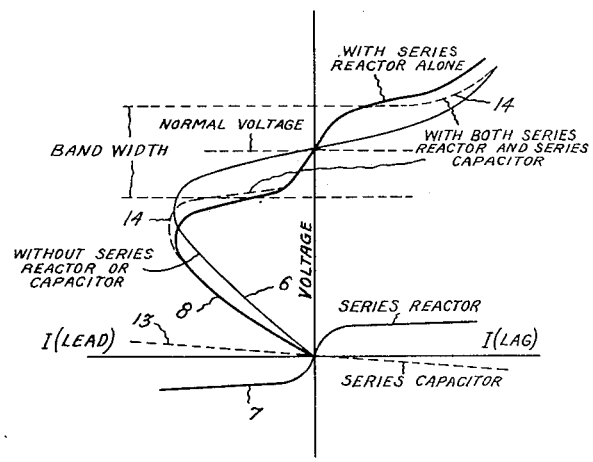
Figure 4:
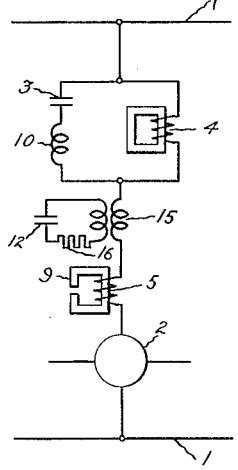

In the drawing, Fig. 1 is a diagrammatic showing of an embodiment of my invention; Fig. 2 is a set of operating characteristics in the form of volt-ampere curves for facilitating an understanding of my invention; Fig. 3 is a modification of Fig. 1 for securing a still more desirable operating characteristic; and Fig. 4 is a modification of Fig. 3.

Referring now to the drawing and more particularly to Fig. 1, I have shown my control circuit arranged to control automatically in response to the voltage of a three-phase circuit 1, the direction of rotation of a motor 2. Motor 2 is adapted to drive any suitable voltage regulator (not shown) for circuit 1. Well-known suitable examples of such regulators are the induction feeder voltage regulator and the transformer tap-changing step regulator.

Motor 2 is of the type whose direction of operation depends upon the relative phase relation of the currents in two windings which may be relatively rotatable as for example the armature and field windings of a commutator type alternating current motor or which may be relatively stationary as in the two stator windings of a two-phase induction motor.

One of the motor windings is connected to be energized by a substantially constant phase current as by connecting it across the two lowermost conductors of circuit 1. The other winding is connected to be energized by a current whose phase reverses in response to the voltage of circuit by connecting it across the two outer conductors of circuit 1 through a non-linear circuit of the parallel ferro-resonant type. This latter circuit consists essentially of a capacitor 3 and an iron core reactor 4 connected in parallel with each other. These elements are so proportioned that they are in resonance when the voltage of circuit 1 is normal. However, such a resonant circuit is very sensitive to slight changes in applied voltage, in that the current through it increases very rapidly for such slight voltage changes.

In order to reduce the initial rate of change of current through the resonant circuit in response to departures of applied voltage from normal, I connect in electrical relationship with the resonant circuit a non-linear element having such a volt-ampere characteristic that the resultant volt-ampere control characteristic is so modified as to give a desired zone of relative insensitivity or small current change with relatively small changes in voltage from the normal or resonant value. One arrangement which I have found suitable for this purpose is the connection of a saturating reactor 5 in series with the parallel resonant circuit.

A more detailed understanding of my invention and its operation can be had by reference to Fig. 2. In this figure the thin continuous curve 6 is the volt-ampere characteristic of the parallel resonant circuit of Fig. 1. It will be seen from this curve that at low voltage the current is leading and that it increases in a substantially linear manner with increases in voltage. Briefly, this is because the core of the reactor 4 is unsaturated and in this condition the reactor operates as a relatively high valued substantially linear impedance.

The impedance of the reactor is higher than that of the capacitor which causes the capacitor current to exceed the reactor current. This accounts for the fact that the resultant current is leading. As the capacitor is a linear impedance element, the difference between the currents in the two elements will also be linear, as shown, before saturation of the core of reactor 4 sets in. Upon increase in voltage, saturation of reactor 4 sets in thereby reducing its impedance value and increasing the amount of lagging current flowing through the parallel circuit. Therefore, as the lagging current increases faster than the leading current increases, after saturation takes place, the resultant leading current of the parallel combination decreases with increases in voltage until the resultant current becomes zero. This is the point where resonance occurs and where the power factor of the parallel combination is unity. It corresponds to normal voltage of the main circuit 1. With further increases in voltage the resultant current increases again but it is now lagging instead of leading, showing that beyond resonance the impedance of the reactor is less than the impedance of the capacitor.

It will be observed that the volt-ampere characteristic 6 is relatively flat for small changes in voltage on either side of resonance and that consequently these small changes in voltage result in relatively large changes in current. These relatively large changes in current cause the motor 2 to start up, and run in reverse directions depending upon whether the voltage goes up or down, in response to very slight voltage deviations from normal.

The series reactor 5 has the volt-ampere characteristic shown by the medium heavy line 7 in Fig. 2. This curve corresponds to the magnetization or saturation curve of the material from which the core of the reactor 5 is made. It is negative on its left-hand side because leading current flowing through an inductive reactance causes a voltage rise and positive values on the volt-ampere characteristics represent voltage drops. The volt-ampere characteristic of reactor 5 is positive on its right-hand side because lagging current flowing through the reactor causes a voltage drop.

The effect of reactor 5 on the volt-ampere curve of the parallel resonant circuit is shown by the heavy line 8, which is the resultant volt-ampere characteristic of the parallel non-linear circuit and the series non-linear element 5 and is obtained by adding together the curves 6 and 7. It will be seen that while the curve 8 has the same general shape as curve 6 it has what may be referred to as a saddle shaped portion near resonance or normal voltage. In other words, the resultant characteristic 8 is relatively steep instead of being relatively flat near resonance so that for appreciable changes in voltage on both sides of resonance, the change in current is relatively small and in terms of the starting current for motor 2 may be small enough as not to cause operation of the motor within a zone or range of voltages indicated by the band width zone marked in Fig. 2. This means that for voltage fluctuations in the band width, the control system is insensitive and the motor will not start, which is a highly desirable characteristic especially in the control of step regulators as pointed out heretofore.

It will also be noted that curve 8 flattens out very quickly for voltages outside of the band width thereby giving the motor a relatively powerful starting current for each direction of operation and causing the regulator to come into play quickly as soon as the voltage departs sufficiently from normal to warrant the operation of the regulator.

The reactor 5 is preferably provided with a core 9 of a nickel-iron alloy which has the well-known property of saturating very sharply. It is this sharp knee or bend in the saturation curve which causes the resultant characteristic 8 to flatten out very quickly as soon as the voltage gets outside of the band width.

In order to be sure that the core 9 does not saturate from higher harmonic currents which may get through the parallel resonant circuit when it is resonant at the fundamental frequency it is best to provide the core with a small air gap.

Higher harmonic currents flowing in the motor and reactor 5 may also be further minimized by means of a reactor 10 connected in the capacitor branch of the parallel resonant circuit. This reactor, while offering low impedance to currents of fundamental frequency will offer relatively high impedance to higher harmonics. This of course is also inherently true of the reactor 4 so that as both branches of the parallel circuit offer high impedance to higher harmonics, these harmonics will be largely blocked or filtered out.

A capacitor 11 is connected in series with the continually energized winding of the motor 2 so as to produce the proper phase relation between its current and the current in the reversibly energized winding.

In Fig. 3, I show a further modification in which the degree of abruptness of flattening out of the control characteristic, when the voltage exceeds the band width, may be increased. This is done by adding a capacitor 12 in series with the reactor 5.

Further reference to Fig. 2 will make the operation of this modification plain. In Fig. 2, the volt-ampere characteristic 13 is that of the capacitor 12. It is of course a straight line, as the capacitor 12 is a linear element, and it is positive, indicating a drop in voltage, for leading current and it is negative, indicating a rise in voltage, for lagging current. When this characteristic is added to the characteristic 8, the latter characteristic is modified as shown by the dashed portion 14 thereof. As will be seen, these dashed portions serve to flatten out the characteristic and make the control device more sensitive to very small changes in voltage outside of the normal zone of insensitivity or band width.

As capacitor 12 must be comparatively large, it is desirable to reduce its size by connecting it in circuit by means of a series transformer 15 which steps up the voltage of the capacitor thereby permitting a smaller capacitor to be used in order to get the same equivalent capacitive effect. Such an arrangement is shown in Fig. 4. It is desirable in this case to insert a resistance 16 in the secondary circuit of the transformer 15 for damping purposes because resonance may occur due to saturation effects in the transformer 15.

While I have shown and described particular embodiments of my invention, it will be obvious to those skilled in the art that changes and modifications can be made in my invention and I therefore aim in the appended claims to cover all such changes and modifications as fall within the true spirit and scope of my invention.

What I claim as new and desire to secure by Letters Patent of the United States is:

1. In combination, a non-linear circuit control arrangement, means for applying a substantially constant frequency variable voltage to said non-linear circuit, an electroresponsive control device connected to be controlled by changes in current in said non-linear circuit caused by changes in voltage applied thereto, and reactance means connected to vary the amount of change of current in said electroresponsive control device in response to predetermined changes in voltage applied to said circuit so as to vary the degree of response of said electroresponsive control device.

2. In combination, a non-linear circuit control arrangement, means for applying a substantially constant frequency variable voltage to said non-linear circuit, an electroresponsive control device connected to be controlled by changes in current in said non-linear circuit caused by changes in voltage applied thereto, and non-linear reactance means connected to reduce the amount of change of current in said electroresponsive control device in response to predetermined relatively small departures from a given value of the voltage applied to said circuit so as to render said electroresponsive device relatively insensitive to said departures.

3. In combination, a non-linear circuit control arrangement, means for applying a substantially constant frequency variable voltage to said non-linear circuit, an electroresponsive control device connected to be controlled by changes in current in said non-linear circuit caused by changes in voltage applied thereto, and reactance means connected to increase the amount of change of current in said electroresponsive control device in response to predetermined relatively large departures from a given value of the voltage applied to said circuit so as to render said electroresponsive control device increasingly sensitive to said departures.

4. In combination, a non-linear control circuit arrangement, means for applying a substantially constant frequency variable voltage to said non-linear circuit, an electroresponsive control device connected to be controlled by changes in current in said non-linear circuit caused by changes in voltage applied thereto, non-linear reactance means connected to reduce the amount of change of current in said electroresponsive control device in response to predetermined relatively small departures from a given value of the voltage applied to said circuit so as to render said electroresponsive control device relatively insensitive to said departures, and reactance means connected to increase the amount of change of current in said electroresponsive control device in response to predetermined relatively large departures from a given value of the voltage applied to said circuit so as to render said electroresponsive control device increasingly sensitive to said departures.

5. In combination, a substantially constant frequency parallel ferro-resonant circuit, an electroresponsive control device connected in series therewith, and a non-linear volt-ampere characteristic element connected in series with said parallel resonant circuit for producing a resultant volt-ampere characteristic having a range on both sides of the resonant point of said resonant circuit and adjacent thereto over which the current is relatively insensitive to relatively small changes in voltage and relatively highly sensitive to relatively large changes in voltage.

6. In combination, a substantially constant frequency parallel ferro-resonant circuit, an electroresponsive control device connected in series therewith, and a saturable reactor connected in series with said parallel resonant circuit for producing a resultant volt-ampere characteristic having a range on both sides of the resonant point of said resonant circuit and adjacent thereto over which the current is relatively insensitive to relatively small changes in voltage and relatively highly sensitive to relatively large changes in voltage.

7. In combination, a substantially constant frequency parallel ferro-resonant circuit, an electroresponsive control device connected in series therewith, a saturable reactor having a nickel-iron core connected in series with said parallel resonant circuit for producing a resultant volt-ampere characteristic having a range on both sides of the resonant point of said resonant circuit and adjacent thereto over which the current is relatively insensitive to relatively small changes in voltage and relatively highly sensitive to relatively large changes in voltage.

8. In combination, a substantially constant frequency parallel ferro-resonant non-linear circuit, a saturable core reactor connected in series with said resonant circuit so as to reduce the rate of change of current through the combination with relatively small variations in voltage on both sides of the resonant voltage, and a capacitor connected in series with said parallel resonant circuit for increasing the rate of change of current in said parallel resonant circuit for voltage variations exceeding said first mentioned variations.

9. In combination, an alternating current circuit, a reversible electric motor, a parallel ferro-resonant circuit connected to control the operation of said motor in response to the voltage of said circuit, and a non-linear volt-ampere characteristic element connected in series with said parallel resonant circuit.

10. In combination, an alternating current circuit, a reversible alternating current motor, a non-linear circuit connected to control said motor in response to the voltage of said circuit, and a non-linear element connected in series with said non-linear circuit for modifying the control characteristic of said non-linear circuit.

11. In combination, an alternating current circuit, a reversible electric motor adapted to drive a voltage regulator for said circuit, a parallel resonant circuit connected to control the direction of operation of said motor in response to the voltage of said circuit, and a saturable reactor connected in series with said resonant circuit and said motor for preventing the operation of said motor on relatively small changes in voltage from a normal value.

12. In combination, an alternating current circuit, a reversible alternating current motor adapted to drive a voltage regulator for said circuit, a parallel ferro-resonant circuit for controlling the operation of said motor in response to the voltage of said circuit, a saturable core reactor and a capacitor connected in series with each other and in series with said motor and parallel resonant circuit for causing said motor to be relatively insensitive to relatively small variations in voltage of said circuit from the normal value and relatively highly sensitive to larger variations in voltage of said circuit from said normal value.

13. In combination, a parallel ferro-resonant voltage responsive non-linear control circuit, and an air core reactor connected in the capacitive branch of said resonant circuit for blocking the flow of higher harmonics therethrough.

14. In combination, an alternating current circuit, a reversible electric motor, means including a parallel ferro-resonant circuit for automatically controlling the operation of said motor in accordance with the voltage of said circuit, and a reactor connected in the capacitive branch of said resonant circuit for preventing the flow of harmonics through said motor.

15. A regulator control circuit comprising, in combination, a substantially constant frequency parallel ferro-resonant non-linear circuit connected to respond to a voltage whose magnitude is a function of a quantity to be regulated, said non-linear circuit being adjusted to resonate when said voltage corresponds to a normal value of said quantity, reversible regulator operating means connected to said non-linear circuit and arranged to be inactive when said non-linear circuit is resonant and to be actuated in opposite directions in response to reversal in phase of the current through said non-linear circuit upon the occurrence of dissonance therein on opposite sides of said resonance condition, and means for reducing the amount of change of current through said reversible means in response to predetermined departures of voltage from the value corresponding to resonance comprising a saturable core reactor connected in series with said non-linear circuit.

16. A regulator control circuit comprising, in combination, a substantially constant frequency parallel ferro-resonant non-linear circuit connected to respond to a voltage whose magnitude is a function of a quantity to be regulated, said non-linear circuit being adjusted to resonate when said voltage corresponds to a normal value of said quantity, reversible regulator operating means connected to said non-linear circuit and arranged to be inactive when said non-linear circuit is resonant and to be actuated in opposite directions in response to reversal in phase of the current through said non-linear circuit upon the occurrence of dissonance therein on opposite sides of said resonance condition, means for reducing the amount of change of current through said reversible means in response to predetermined departures of voltage from the value corresponding to resonance comprising a saturable core reactor connected in series with said non-linear circuit, and means for increasing the amount of change of current through said reversible means in response to greater than said predetermined departures of said voltage comprising a capacitor connected in series with said non-linear circuit.

17. In a voltage responsive control system, a variable voltage substantially constant frequency main alternating current circuit having a predetermined normal voltage, a voltage responsive circuit connected in shunt across said main circuit, an electroresponsive control device connected in said shunt circuit, a capacitor, a saturable iron core reactor, said capacitor and reactor being connected in parallel circuit relation with each other and in series circuit relation with said control device in said shunt circuit, said capacitor and reactor being so proportioned as to produce parallel resonance when the voltage of said main circuit is normal and to produce dissonance due to changes in the saturation of the core of said reactor when said voltage departs from normal whereby the current in said electroresponsive device is substantially zero when said voltage is normal and tends to increase relatively rapidly when said voltage departs from normal, and means for minimizing said increase for relatively small departures of said voltage from normal while permitting the full increase for relatively large departures of said voltage from normal comprising a second saturable iron core reactor connected in series circuit relation with said control device in said shunt circuit.

18. In a voltage responsive control system, a variable voltage substantially constant frequency main alternating current circuit having a predetermined normal voltage, a voltage responsive circuit connected in shunt across said main circuit, an electroresponsive control device connected in said shunt circuit, a capacitor, a saturable iron core reactor, said capacitor and reactor being connected in parallel circuit relation with each other and in series circuit relation with said control device in said shunt circuit, said capacitor and reactor being so proportioned as to produce parallel resonance when the voltage of said main circuit is normal and to produce dissonance due to changes in the saturation of the core of said reactor when said voltage departs from normal whereby the current in said electroresponsive device is substantially zero when said voltage is normal and tends to increase relatively rapidly when said voltage departs from normal, means for minimizing said increase for relatively small departures of said voltage from normal while permitting the full increase for relatively large departures of said voltage from normal comprising a second saturable iron core reactor connected in series circuit relation with said control device in said shunt circuit, and means for magnifying said increase for said relatively large departures of voltage from normal comprising a capacitor connected in series circuit relation with said control device in said shunt circuit.

19. In a voltage responsive control system, a variable voltage substantially constant frequency main alternating current circuit having a predetermined normal voltage, a voltage responsive circuit connected in shunt across said main circuit, an electric motor having a winding for controlling the starting, stopping and reversing of said motor connected in said shunt circuit, a capacitor, a saturable iron core reactor, said capacitor and reactor being connected in parallel circuit relation with each other and in series circuit relation with said winding in said shunt circuit, said capacitor and reactor being so proportioned as to produce parallel resonance when the voltage of said main circuit is normal and to produce dissonance due to changes in the saturation of the core of said reactor when said voltage departs from normal whereby the current in said winding is substantially zero when said voltage is normal and tends to increase relatively rapidly when said voltage departs from normal, and means for minimizing said increase for relatively small departures of said voltage from normal while permitting the full increase for relatively large departures of said voltage from normal comprising a second saturable iron core reactor connected in series circuit relation with said winding in said shunt circuit.

20. In a voltage responsive control system, a variable voltage substantially constant frequency main alternating current circuit having a predetermined normal voltage, a voltage responsive circuit connected in shunt across said main circuit, an electroresponsive control device connected in said shunt circuit, a capacitor, a saturable iron core reactor, said capacitor and reactor being connected in parallel circuit relation with each other and in series circuit relation with said control device in said shunt circuit, said capacitor and reactor being so proportioned as to produce parallel resonance when the voltage of said main circuit is normal and to produce dissonance due to changes in the saturation of the core of said reactor when said voltage departs from normal whereby the current in said electroresponsive device is substantially zero when said voltage is normal and tends to increase relatively rapidly when said voltage departs from normal, means for minimizing said increase for relatively small departures of said voltage from normal while permitting the full increase for relatively large departures of said voltage from normal comprising a second saturable iron core reactor connected in series circuit relation with said control device in said shunt circuit, and means for magnifying said increase for said relatively large departures of voltage from normal comprising a capacitor connected in series circuit relation with said control device in said shunt circuit.

WERNER KRÄMER.